United States Patent [19]

Bienert et al.

[11] Patent Number: 4,548,439
[45] Date of Patent: Oct. 22, 1985

[54] TELESCOPIC WINCH DRIVE

[75] Inventors: Horst Bienert, Gauting; August Hirschberger, Munich, both of Fed. Rep. of Germany

[73] Assignee: Webasto-Werk W. Baier GmbH & Co., Fed. Rep. of Germany

[21] Appl. No.: 463,255

[22] Filed: Feb. 2, 1983

[30] Foreign Application Priority Data

May 3, 1982 [DE] Fed. Rep. of Germany ....... 3216402

[51] Int. Cl.$^4$ .............................................. B60J 7/00
[52] U.S. Cl. ..................................... 296/223; 296/222
[58] Field of Search ................................ 49/463, 465; 296/217-224

[56] References Cited

U.S. PATENT DOCUMENTS 4,142,761 3/1979 Lutz et al. ........................... 296/137
4,191,018 3/1980 Jardin et al. ........................ 251/136
4,428,614 1/1984 Vogel et al. ......................... 296/224

Primary Examiner—Richard A. Bertsch
Attorney, Agent, or Firm—Sixbey, Friedman & Leedom

[57] ABSTRACT

A telescopic winch for tilting a cover closing a roof opening in a motor vehicle, with a plurality of threaded parts, screwable into one another, of which the outermost or innermost is connected with an axially fixed wheel and the other threaded part is connected with the cover. In order to make a telescopic winch of this type electrically drivable and to provide it with an emergency manual drive, provision is made for a crown gear to be on an outside jacket of the wheel, said crown gear being in mesh with a worm shaft of an electric motor unit, and for the mesh between the crown gear and worm shaft to be releasable. Separation between the crown gear and the worm shaft can be accomplished either by removing the wheel or by pivoting the electric motor unit.

17 Claims, 3 Drawing Figures

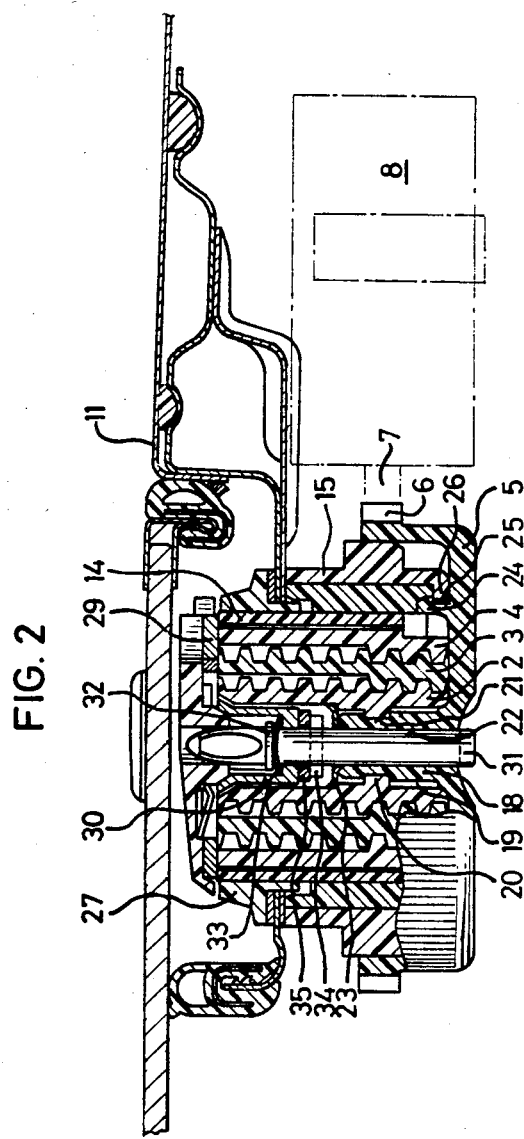

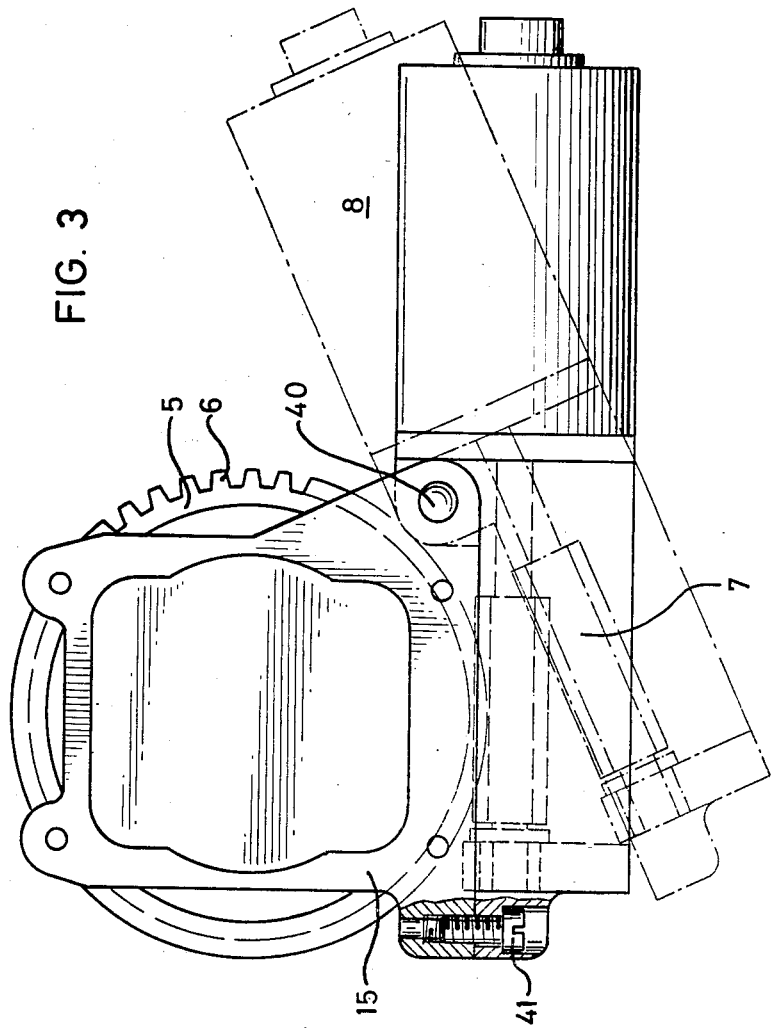

TELESCOPIC WINCH DRIVE

BACKGROUND AND SUMMARY OF THE INVENTION

The invention relates to a telescopic winch for tilting a cover which closes a roof opening in a motor vehicle, with a plurality of threaded parts screwable into one another, the outermost or innermost of said parts being connected with an axially fixed wheel and the corresponding other threaded part being connected with the cover.

Telescopic winches of this type are known from German Pat. No. 2,710,193 (corresponding to U.S. Pat. No. 4,142,761) and German Offenlegungsschrift No. 2,928,994 (corresponding to commonly assigned U.S. patent application Ser. No. 170,184, filed July 18, 1980) now U.S. Pat. No. 4,428,614. These known telescopic winches are suitable only for manual operation, i.e., the wheel must be rotated in one direction or the other to tilt the cover up and down, whereupon the telescopic threaded parts, which fit into one another, are extended or retracted.

German Pat. No. 2,626,014 (corresponding to U.S. Pat. No. 4,191,068) teaches a drive means for an electrically operated sliding and tilting roof in a motor vehicle. In this known device, an electrical drive device actuates the sliding and tilting roof, whereby the drive pinion of the drive device meshes with flexible, compression-resistant threaded cables. By means of a hexagon socket, the drive pin can be actuated at the end which projects into the interior of the motor vehicle by a crank resembling a hex wrench, whereby the positive connection between the electric motor and gear reduction unit and the drive shaft is interruptable by means of a lever.

The goal of the present invention is to design a telescopic winch of the type recited hereinabove in such a manner that it is electrically actuatable and comprises an emergency actuating means.

This goal is achieved, in accordance with preferred embodiments of the invention, by virtue of the fact that a crown gear is provided on the outside jacket of the wheel, said crown gear meshing with a worm shaft of an electric motor, and by the fact that the engagement between the crown gear and the worm shaft is designed to be separable. In this manner, the invention provides electrical actuation for the telescopic winch by simple and, therefore, inexpensive means.

According to one advantageous embodiment of the invention, the wheel is removed to release the engagement between the crown gear and the worm shaft, so that the effective connection between the drive motor and the threaded part, which is otherwise connected to the wheel, is interrupted. The threaded part can then be rotated manually or with the aid of a simple tool in order to close the roof hatch.

An embodiment wherein the wheel is releasably connected with the innermost threaded part and the cover is releasably connected with the outermost threaded part is especially advantageous in this respect. In this embodiment, the innermost threaded part is rotated directly by the wheel, whereupon the outer threaded parts, disposed telescopically above the innermost threaded part, are displaced outward to open the roof hatch.

An embodiment in which the wheel is connected with the innermost threaded part by a central screw has proven to be especially advantageous. The screw can be loosened, if necessary, with the aid of a coin, for example, to remove the wheel from the innermost threaded part and thus, to disconnect the motor and the telescopic winch for emergency actuation.

Advantageously, a central polygonal recess, for example, a hexagonal recess, is provided in this embodiment in the innermost threaded part, by means of which recess the inner threaded part can be rotated with the aid of hex wrench for emergency actuation.

The special embodiments of the invention described hereinabove are especially suitable for a telescopic winch according to German Pat. No. 2,710,193 (corresponding to U.S. Pat. No. 4,142,761), wherein the cover to be actuated can be separated from the telescopic winch on the side of the telescopic winch which is away from the wheel, i.e., nearest the cover.

In embodiments in which the separation between the cover and the telescopic winch is effected by means of a pin guided centrally through the telescopic winch (German OS No. 2,928,994, corresponding to U.S. patent application Ser. No. 170,184) now U.S. Pat. No. 4,428,614, the separation between the electric motor and the crown gear of the wheel, according to one advantageous embodiment of the invention, is accomplished by virtue of the fact that the electric motor, mounted on a pivot, pivots in a manner causing its drive pinion or its worm shaft to disengage from the crown gear of the wheel.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is another embodiment of a telescopic winch, likewise shown in axial section; and FIG. 3 is a top view of the telescopic winch shown in FIG. 2.

DETAILED DESCRIPTION OF THE PREFERRED EMBODIMENTS

Figure 1:
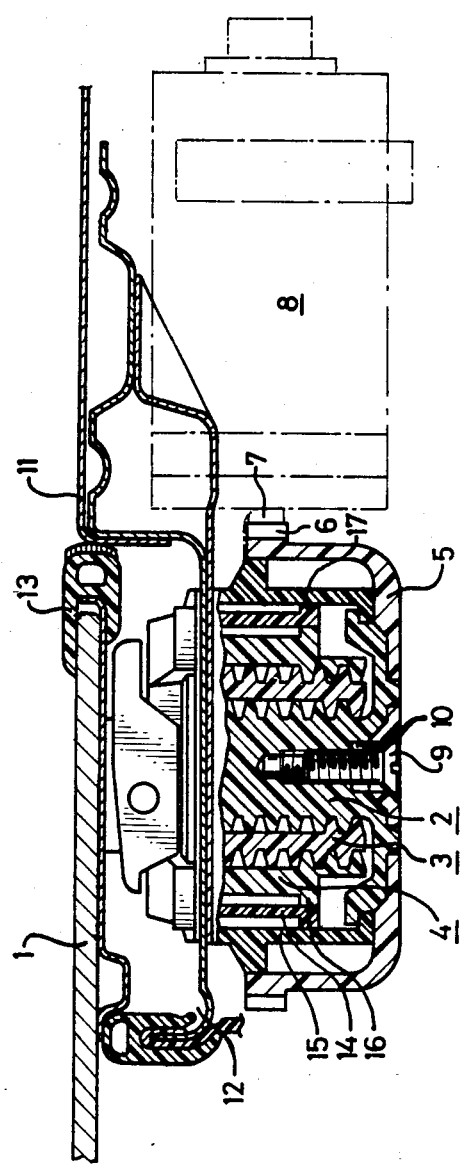
FIG. 1 is an axial section through a telescopic winch disposed in a motor vehicle for actuating a cover closing a roof opening.

As shown in FIG. 1, a roof opening is provided in a vehicle roof, said opening being surrounded by a roof frame 11 forming a gutter 12. The roof opening is normally closed by a cover 1, said cover being pivotably mounted at roof frame 11 in the vicinity of its leading edge (not shown) and tiltable at is trailing edge by means of a telescopic winch. In order to be able to completely remove cover 1, the pivoting connection between the leading edge of cover 1 and roof frame 11 is made releasable and for this purpose, for example, as a plug-in connection, having two tabs projecting forward from the leading edge of the cover, said tabs engaging corresponding slots in the vertical front wall of roof frame 11 of the type shown in the above-noted U.S. Ser. No. 170,184. The telescopic winch is likewise mounted releasably on cover 1, as will be described in greater detail hereinbelow.

The telescopic winch itself consists of a first threaded part 2 with an outside thread, a second threaded part 4 with an inside thread, and a third threaded part 3 with an inside thread and an outside thread, said threads engaging the outside thread of threaded part 2 and the inside thread of threaded part 4, respectively. First, threaded part 2 is mounted rotatably, but nondisplaceably on roof frame 11, and comprises a wheel 5, by whose rotation the telescopic winch can be extended and retracted. Threads 2, 3 and 4 are of the multiple thread type, in order to achieve the largest possible extension travel of the telescopic winch with relatively little rotation of wheel 5. Threaded part 4 is pivotably connected to the cover, but is fixed against rotation relative thereto. For this purpose, threaded part 4 comprises two locking pins (not shown) which extend diametrally, each of the pins being capable of engaging a groove of a manually operable lock, said lock being fastened to cover 1 by a bearing housing and being compressable against the action of a spring (not shown), in order to release the pin and permit cover 1 to be removed. The releasable connection between cover 1 and the telescopic winch causes the spring to press the lock against the locking pin under continuous spring tension, whereby, on the one hand, the necessary displacement of the pin relative to cover 1 is permitted when the latter is raised, and, on the other hand, rattling noise is avoided.

In order to prevent the second threaded part 4 from rotating when cover 1 is removed and the wheel 5 is rotated (thereby permitting the telescopic winch to be retracted when the cover is removed), the outside profile of the second threaded part 4 has the shape of an elongated rectangle (see FIG. 3) and second threaded part 4 is surrounded by a sleeve 14 which has a matching inside shape and is guided nonrotatably, but axially displaceably, on a rectangular ring 15 fastened to roof frame 11. Sleeve 14 is entrained by virtue of the fact that the outer edge of sleeve 14 comprises a plurality of inwardly projecting projections (not shown) which are entrained by corresponding stops 16 on the outer surface of second threaded part 4.

The outward movement of sleeve 4 can be limited by outwardly projection projections 17 on the outer edge of sleeve 14, said projections being located on two opposite sides of this edge and being capable of cooperating with corresponding stops (not shown) on ring 15.

To reduce the friction between sleeve 14 and ring 15, lengthwide ribs can be provided on the inside of ring 15. Corresponding lengthwise ribs can also be provided between sleeve 14 and second threaded part 4.

Wheel 5 is fastened to first threaded part 2 by means of a screw 9, said screw being releasable by a screwdriver or a coin in order to pull off wheel 5, which surrounds the telescopic winch. A crown gear 6, which meshes with a drive gear, in the form of a pinion or worm gear 7, of an electric motor 8 is located on the outside jacket of wheel 5, such as by being unitarily formed thereon.

When motor 8 is set in motion, pinion 7 drives crown gear 6 and thus wheel 5, which in turn drives the first, innermost threaded part 2. Consequently, the second and third threaded parts are extended successively or simultaneously, whereby cover 1 is raised at its trailing edge.

If the motor should fail or the power supply be interrupted, screw 9 may be undone, whereupon wheel 5 can be pulled off in an axial direction, interrupting the connection to drive pinion 7 of the motor. Removal of wheel 5 reveals a polygonal recess, preferably a hexagonal opening 10, into which a type of hex wrench in the form of a crank can be introduced in order to rotate first threaded part 2 and retract and telescopic winch further.

The tilting device shown in FIG. 2, likewise, comprises a telescopic winch consisting of a first threaded part 2, in intermediate threaded part 3, and an outside threaded part 4. Threaded part 2 has an outside thread which engages an inside thread of intermediate threaded part 3. Intermediate threaded part 3 also comprises an outside thread which meshes with an inside thread on outside threaded part 4. A wheel 5 with hub 18 slotted in the axial direction is nonrotatably connected with threaded part 2 by a toothed area 19. An inward projection 20 on threaded part 2 fits into a corresponding annular groove 21 on hub 18 in order to provide a mutual connection for wheel 5 and threaded part 2 against relative axial shifting. Hub 18 comprises a central bore 22 which expands conically at its upper end. A spring washer 23 has an outer edge which abuts against the inside wall of sleeve-shaped threaded part 2 and overlaps the upper end of hub 18 with its inside edge in such fashion that the hub parts are spread outward.

A rib 24 on wheel 5, which is concentric to hub 18, has an annular groove 25 on its outside, into which groove an annular projection 26 of a ring part 15 fits with play. Ring part 15 is fastened to roof frame 11, and a cover part 27 is mounted on the upper side of frame 11. Screws (not shown) that fit into bores in ring part 15 and extend through bores in frame 11 connect ring part 15 and cover 27 with the fixed roof part. In a space delimited by ring part 15, cover 27, and outside threaded part 4, a sleeve 14 with a rectangular cross section is guided. Sleeve 14 has two inwardly projecting ribs (not shown) on opposite sides in the vicinity of its upper end, while projections (not shown) project outward in the vicinity of the lower end of the sleeve (see Ser. No. 170,184). Sleeve 14 is displaceable axially until stops abut cover 27, while outside threaded part 4, which is prevented from rotating by its engagement with sleeve 14, is movable upward until the outwardly projecting stops on outside threaded part 4 strike the ribs (not shown) on sleeve 14.

A plate 29 is screwed to outside threaded part 4, said plate comprising a hub 30 which extends into the interior of threaded part 2. A pin 31 is rotatably mounted in hub 30. Pin 31 abuts a spring washer 33 resting in hub 30 by means of a bead 32. Bead 32 is held in contact with spring washer 33 by means of a cross pin 34 and a washer 35 which abuts the end of hub 30. At its lower end, pin 31 is provided with a slot into which the edge of a coin or the like can be introduced. Pin 31 is tapered conically in the vicinity of its upper end and provided at opposite sides with two shoulders. The length of pin 31 is selected so that, when cover 1 is in the closed position, the slotted lower end of the pin projects out of hub 18 into a depression in wheel 5 and is thereby accessible for actuation by a coin or the like.

Cover 1 is provided with two pillow blocks (not shown) into each of which one bearing pin is inserted. The bearing pins extend into the bores of a bridge, in order, in this fashion, to hold the bridge in a pivotable position so that it can pivot about an axis on the cover which is perpendicular to the length of the vehicle. The bridge is provided, in its central part, with a downwardly projecting projection, which forms two channels that extend in the direction of the length of the vehicle. The shoulders of a locking spring (not shown)

extend through the channels. The shoulders project in the vicinity of a central recess in the projection and can move laterally with limitations in the direction of the axis formed by the bearing pins. Again, reference may be made to Ser. No. 170,184.

Normally, the legs of the locking spring are located beneath the shoulders of pin 31, in order, in this fashion, to link the tilting device with cover 1. If pin 31 is rotated through 90° by means of a coin or the like with the cover closed, the locking spring is spread. The legs are disengaged from the shoulders. The tilting device is now separated from cover 1.

A crown gear 6 is disposed on the outside jacket of wheel 5, with which crown gear a motor unit formed of a drive pinion or worm gear 7 and an electric motor 8 is drivingly engaged. In order to be able to actuate the telescopic winch of this embodiment, in the event that the electric motor 8 should fail, the motor unit is mounted to pivot about an axis which is parallel to the axis of the telescopic winch, so that worm gear 7 is released from crown gear 6 of wheel 5. Wheel 5 has a fluted area on its outside jacket below crown gear 6, so that it can be rotated by hand.

In the top view in FIG. 3, the pivoting device for the electric motor can be seen especially clearly. Electric motor 8 is mounted on a pin 40 which is parallel to the axis of the telescopic winch. In order to keep worm gear 7 of drive motor 8 meshed with crown gear 6 of wheel 5 under normal conditions, the housing of the motor unit is screwed to ring part 15 by a screw 41. By disconnecting screw 41, the motor unit can be pivoted to the position indicated by the dot-dashed lines.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A telescopic winch drive for tilting a cover closing a roof opening in a motor vehicle, comprising a plurality of telescopingly interconnected screw-threaded parts of which one of an outermost and an innermost of the screw-threaded parts is connected with an axially fixed wheel and the other of which screw-threaded part is constructed for connection with the cover, wherein a crown gear is provided on an outside jacket of said wheel, said crown gear meshing with a drive gear of an electric motor unit, and the engagement between said crown gear and drive gear being releasable, wherein said releasable engagement between the crown and drive gears is achieved by said electric motor unit being pivotally mounted in a manner enabling pivotal displacement of the said drive gear relative to said crown gear.

2. A telescopic winch drive according to claim 1, wherein the releasable engagement between the crown gear and drive gear is achieved by said wheel being removably mounted to said one of the screw-threaded parts.

3. A telescopic winch drive according to claim 2, wherein said wheel is connected releasably with the innermost of said screw-threaded parts and the cover is releasably connectable with the outermost of said screw-threaded parts.

4. A telescopic winch drive according to claim 3, wherein the innermost threaded part has a central polygonal recess for reception of a tool for use in manually operating the winch drive.

5. A telescopic winch drive according to claim 4, further comprising disengageable means for securing said motor unit preventing said pivotal displacement.

6. A telescopic winch drive according to claim 1, further comprising disengageable means for securing said motor unit preventing said pivotal displacement.

7. A telescopic winch drive according to claim 1, wherein said drive gear is a worm gear.

8. A telescopic winch drive for tilting a cover closing a roof opening in a motor vehicle, comprising a plurality of telescopingly interconnected screw-threaded parts of which one of an outermost and an innermost of the screw-threaded parts is connected with an axially fixed wheel and the other of which screw-threaded part is constructed for connection with the cover, wherein a crown gear is provided on an outside jacket of said wheel, said crown gear meshing with a drive gear of an electric motor unit, and the engagement between said crown gear and drive gear being releasable, wherein the releasable engagement between the crown gear and drive gear is achieved by said wheel being removably mounted to said one of the screw-threaded parts, wherein said wheel is connected releasably with the innermost of said screw-threaded parts and the cover is releasably connectable with the outermost of said screw-threaded parts, wherein said wheel is connected with the innermost of said screw-threaded parts by a central disposed screw.

9. A telescopic winch drive according to claim 8, wherein the innermost threaded part has a central polygonal recess for reception of a tool for using in manually operating the winch drive.

10. In a vehicle roof construction of the type having a roof opening a cover therefor that is tiltable by a telescopic winch having a plurality of interconnected screw-threaded parts, one of an innermost and outermost of which is connected with a wheel and the other of which is connected with the cover, the improvement for enabling said telescopic winch to be both manually operable and operable by a drive motor, comprising the provision of a crown gear on the periphery of said wheel, said crown gear being releasably engaged with a drive gear of an electric motor unit.

11. In a vehicle roof construction of the type according to claim 10, wherein the releasable engagement between the crown gear and drive gear is achieved by said wheel being removably mounted to said one of the screw-threaded parts.

12. In a vehicle roof construction of the type according to claim 11, wherein said wheel is connected releasably with the innermost of said screw-threaded parts and the cover is releasably connectable with the outermost of said screw-threaded parts.

13. In a vehicle roof construction of the type according to claim 12, wherein said wheel is connected with the innermost of said screw-threaded parts by a central disposed screw.

14. In a vehicle roof construction of the type according to claim 12, wherein the innermost threaded part has a central polygonal recess for reception of a tool for using in manually operating the winch drive.

15. In a vehicle roof construction of the type according to claim 6, wherein said releasable engagement between the crown said drive gears is achieved by said electric motor unit being pivotably mounted in a manner enabling pivotal displacement of the said drive gear relative to said crown gear.

16. In a vehicle roof construction of the type according to claim 15, further comprising disengageable means for securing said motor unit preventing said pivotal displacement.

17. In a vehicle roof construction of the type according to claim 10, wherein said drive gear is a worm gear.

* * * * *

UNITED STATES PATENT AND TRADEMARK OFFICE
CERTIFICATE OF CORRECTION

PATENT NO. : 4,548,439
DATED : October 22, 1985
INVENTOR(S) : Horst Bienert and August Hirschberger It is certified that error appears in the above-identified patent and that said Letters Patent are hereby corrected as shown below:

In claim 15, line 3, "said drive gears" should read --gear and drive gears --.

Signed and Sealed this

Fourth Day of March 1986

[SEAL]

Attest:

DONALD J. QUIGG

Attesting Officer

Commissioner of Patents and Trademarks